US007835903B2

(12) United States Patent
Datta

(10) Patent No.: US 7,835,903 B2
(45) Date of Patent: Nov. 16, 2010

(54) SIMPLIFYING QUERY TERMS WITH TRANSLITERATION

(75) Inventor: Ruchira S. Datta, Mountain View, CA (US)

(73) Assignee: Google Inc., Mountain View, CA (US)

(*) Notice: Subject to any disclaimer, the term of this patent is extended or adjusted under 35 U.S.C. 154(b) by 1109 days.

(21) Appl. No.: 11/407,860

(22) Filed: Apr. 19, 2006

(65) Prior Publication Data

US 2007/0288230 A1    Dec. 13, 2007

(51) Int. Cl.
G06F 17/27    (2006.01)
G06F 17/20    (2006.01)
(52) U.S. Cl. ............................................. 704/9; 704/8
(58) Field of Classification Search ............... 704/1–10; 707/5
See application file for complete search history.

(56) References Cited

U.S. PATENT DOCUMENTS

| | | | |
|---|---|---|---|
| 5,265,065 A | 11/1993 | Turtle | |
| 5,418,948 A | 5/1995 | Turtle | |
| 5,664,027 A | 9/1997 | Ittner | |
| 5,717,913 A | 2/1998 | Driscoll | |
| 5,835,912 A * | 11/1998 | Pet ........................... | 707/104.1 |
| 5,956,711 A | 9/1999 | Sullivan et al. | |
| 6,006,221 A | 12/1999 | Liddy et al. | |
| 6,076,088 A | 6/2000 | Paik et al. | |
| 6,078,914 A | 6/2000 | Redfern | |
| 6,167,369 A | 12/2000 | Schulze | |
| 6,263,335 B1 | 7/2001 | Paik et al. | |
| 6,272,456 B1 | 8/2001 | de Campos | |
| 6,415,250 B1 | 7/2002 | van den Akker | |
| 6,519,585 B1 | 2/2003 | Kohli | |
| 6,546,365 B1 | 4/2003 | Gajda et al. | |
| 6,615,168 B1 * | 9/2003 | Resnik et al. ................... | 704/8 |
| 6,715,130 B1 | 3/2004 | Eiche et al. | |
| 6,999,932 B1 | 2/2006 | Zhou | |
| 7,054,803 B2 * | 5/2006 | Eisele .......................... | 704/2 |
| 7,103,532 B1 | 9/2006 | Murray et al. | |
| 7,120,869 B2 | 10/2006 | Birder | |

(Continued)

OTHER PUBLICATIONS

Step Two Designs Pty Ltd, "Deploying an effective search engine," 2001, p. 6.

(Continued)

Primary Examiner—Talivaldis Ivars Smits
Assistant Examiner—Shaun Roberts
(74) Attorney, Agent, or Firm—Fish & Richardson P.C.

(57) ABSTRACT

Methods, systems, and apparatus, including computer program products, operable to perform operations including receiving from a user a search query; and receiving an indication of a user preference to apply transliteration in simplifying the query terms of the search query. Alternatively, the operations include receiving from a user a search query of query terms; applying transliteration in simplifying the query terms; and using the simplified query terms to identify synonyms to use in augmenting the search query. Alternatively, the operations include receiving from a user a search query; identifying the user interface language as a small language or not a small language; simplifying each query term to a simplified form; and if the user interface language is a small language, for each original query term that has a simplified form different from the original term, using the original query term as-is and not providing any synonyms for the query term.

18 Claims, 37 Drawing Sheets

U.S. PATENT DOCUMENTS

| | | | |
|---|---|---|---|
| 7,191,116 B2* | 3/2007 | Alpha | 704/8 |
| 7,277,846 B2 | 10/2007 | Satoh | |
| 2001/0047261 A1 | 11/2001 | Kassan | |
| 2002/0052871 A1 | 5/2002 | Chang et al. | |
| 2002/0059069 A1 | 5/2002 | Hsu et al. | |
| 2002/0091661 A1 | 7/2002 | Anick et al. | |
| 2002/0145742 A1 | 10/2002 | Koenig et al. | |
| 2002/0161733 A1 | 10/2002 | Grainger | |
| 2003/0018468 A1 | 1/2003 | Johnson et al. | |
| 2003/0037136 A1 | 2/2003 | Labovitz et al. | |
| 2003/0097252 A1* | 5/2003 | Mackie | 704/9 |
| 2003/0149686 A1 | 8/2003 | Drissi et al. | |
| 2003/0149687 A1 | 8/2003 | Brown et al. | |
| 2003/0217052 A1 | 11/2003 | Rubenczyk | |
| 2004/0064447 A1 | 4/2004 | Simske et al. | |
| 2004/0133418 A1 | 7/2004 | Turcato et al. | |
| 2004/0153435 A1 | 8/2004 | Gudbjartsson et al. | |
| 2005/0065774 A1 | 3/2005 | Doganata et al. | |
| 2005/0154578 A1 | 7/2005 | Tong et al. | |
| 2005/0177358 A1 | 8/2005 | Melomed et al. | |
| 2005/0216253 A1* | 9/2005 | Brockett | 704/5 |
| 2006/0031207 A1 | 2/2006 | Bjarnestam et al. | |
| 2006/0112091 A1* | 5/2006 | Chapman et al. | 707/4 |
| 2006/0277189 A1* | 12/2006 | Cencini | 707/10 |
| 2006/0293874 A1 | 12/2006 | Zhang et al. | |
| 2007/0016476 A1 | 1/2007 | Hoffberg et al. | |
| 2007/0129935 A1 | 6/2007 | Uchimoto et al. | |
| 2007/0219933 A1 | 9/2007 | Datig | |
| 2007/0244866 A1 | 10/2007 | Mishkanian et al. | |
| 2007/0288448 A1 | 12/2007 | Datta | |
| 2007/0288449 A1 | 12/2007 | Datta et al. | |
| 2007/0288450 A1 | 12/2007 | Datta et al. | |
| 2008/0059153 A1 | 3/2008 | Bennett | |

OTHER PUBLICATIONS

International Search Report and Written Opinion of the International Searching Authority, PCT Application Serial No. PCT/US2007/67014, Jun. 23, 2008, 12 pp.

Berger, "Activation on the Move: Adaptive Information Retrieval via Spreading Activation," dated Jul. 8, 2003, 105 pages.

Gong, "Semantic Documents for Web Ontology Building," Mar. 14, 2005, 50 pages.

Kapetanios et al., "Multi-lingual Web Querying: A Parametric Linguistics Based Approach," Apr. 19, 2006, 12 pages.

O'Hara, "Empirical Acquisition of Conceptual Distinctions via Dictionary Definitions," dated Aug. 31, 2005, 175 pages.

International Preliminary Report on Patentability for PCT International Application No. PCT/US2007/067014; dated Oct. 22, 2008; 9 pages.

Chinese Office Action for Application No. 200780021902.1; dated Mar. 4, 2010; 3 pages.

* cited by examiner

| Key (common form) | Variant | Language | Relative Frequency | Frequency |
|---|---|---|---|---|
| elephant | éléphant | English | 52% | 100 |
| | | French | 77% | 1000 |
| | eléphant | English | 48% | 90 |
| | | French | 23% | 300 |
| liberte | liberte | English | 58% | 550 |
| | | French | 29% | 650 |
| | liberté | English | 42% | 400 |
| | | French | 71% | 1600 |
| nityananda | nityananda | English | 51% | 200 |
| | | Bengali | 10% | 200 |
| | | [Roman] Indic | 39% | 600 |
| 410 | nity.a-nanda | [Roman] Indic | 1% | 6 |
| | | Bengali | 1% | 6 |
| 420 | nityAnanda | English | 13% | 50 |
| | | [Roman] Indic | 53% | 800 |
| | | Bengali | 7% | 150 |
| 430 | nityãnanda | English | 8% | 30 |
| | | [Roman] Indic | 8% | 120 |
| | | Bengali | 9% | 190 |
| | নিত্যানন্দ | Bengali | 74% | 1550 |
| | | English | 28% | 110 |

FIG. 4

Generic

| In | UCS | Out | In | UCS | Out | In | UCS | Out | In | UCS | Out |
|---|---|---|---|---|---|---|---|---|---|---|---|
| À | 00C0 | A | Ê | 00CA | E | İ | 0130 | I | Ñ | 00D1 | N |
| Á | 00C1 | A | Ë | 00CB | E | І | 0406 | I | Ń | 0143 | N |
| Â | 00C2 | A | Ē | 0112 | E | Ї | 0407 | I | Ņ | 0145 | N |
| Ã | 00C3 | A | Ė | 0116 | E | ì | 00EC | i | Ň | 0147 | N |
| Ā | 0100 | A | Ę | 0118 | E | í | 00ED | i | ñ | 00F1 | n |
| Ă | 0102 | A | Ě | 011A | E | î | 00EE | i | ń | 0144 | n |
| Ą | 0104 | A | è | 00E8 | e | ï | 00EF | i | ņ | 0146 | n |
| à | 00E0 | a | é | 00E9 | e | ī | 012B | i | ň | 0148 | n |
| á | 00E1 | a | ê | 00EA | e | į | 012F | i | Ò | 00D2 | O |
| â | 00E2 | a | ë | 00EB | e | ı | 0131 | i | Ó | 00D3 | O |
| ã | 00E3 | a | ē | 0113 | e | і | 0456 | i | Ô | 00D4 | O |
| ā | 0101 | a | ė | 0117 | e | ї | 0457 | i | Õ | 00D5 | O |
| ă | 0103 | a | ę | 0119 | e | Ĵ | 0134 | J | Ő | 0150 | O |
| ą | 0105 | a | ě | 011B | e | Ј | 0408 | J | ò | 00F2 | o |
| Ç | 00C7 | C | Ĝ | 011C | G | ĵ | 0135 | j | ó | 00F3 | o |
| Ć | 0106 | C | Ğ | 011E | G | ј | 0458 | j | ô | 00F4 | o |
| Ĉ | 0108 | C | Ģ | 0122 | G | Ķ | 0136 | K | õ | 00F5 | o |
| Č | 010C | C | ĝ | 011D | g | ķ | 0137 | k | ő | 0151 | o |
| ç | 00E7 | c | ğ | 011F | g | Ĺ | 0139 | L | Ŕ | 0154 | R |
| ć | 0107 | c | ģ | 0123 | g | Ļ | 013B | L | Ŗ | 0156 | R |
| ĉ | 0109 | c | Ĥ | 0124 | H | Ľ | 013D | L | Ř | 0158 | R |
| č | 010D | c | ĥ | 0125 | h | Ŀ | 013F | L | ŕ | 0155 | r |
| Ð | 00D0 | D | Ì | 00CC | I | Ł | 0141 | L | ŗ | 0157 | r |
| Ď | 010E | D | Í | 00CD | I | ĺ | 013A | l | ř | 0159 | r |
| ð | 00F0 | d | Î | 00CE | I | ļ | 013C | l | Ś | 015A | S |
| ď | 010F | d | Ï | 00CF | I | ľ | 013E | l | Ŝ | 015C | S |
| È | 00C8 | E | Ī | 012A | I | ŀ | 0140 | l | Ş | 015E | S |
| É | 00C9 | E | Į | 012E | I | ł | 0142 | l | Š | 0160 | S |
|   |   |   |   |   |   |   |   |   | Ș | 0218 | S |

Generic (con't)

| In | UCS | Out | | In | UCS | Out | | In | UCS | Out |
|---|---|---|---|---|---|---|---|---|---|---|
| ś | 015B | s | | Ý | 00DD | Y | | nj | 01CC | nj |
| ŝ | 015D | s | | IJ | 0132 | Y | | Ø | 00D8 | Oe |
| ş | 015F | s | | ý | 00FD | y | | Œ | 0152 | Oe |
| š | 0161 | s | | ij | 0133 | y | | ø | 00F8 | oe |
| ş | 0219 | s | | Ź | 0179 | Z | | œ | 0153 | oe |
| Ţ | 0162 | T | | Ż | 017B | Z | | ß | 00DF | ss |
| Ť | 0164 | T | | Ž | 017D | Z | | Þ | 00DE | Th |
| Ț | 021A | T | | ź | 017A | z | | þ | 00FE | th |
| ţ | 0163 | t | | ż | 017C | z | | | | |
| ť | 0165 | t | | ž | 017E | z | | | | |
| ț | 021B | t | | Å | 00C5 | Aa | | | | |
| Ù | 00D9 | U | | Æ | 00C6 | Ae | | | | |
| Ú | 00DA | U | | å | 00E5 | aa | | | | |
| Û | 00DB | U | | æ | 00E6 | ae | | | | |
| Ū | 016A | U | | Đ | 0110 | Dj | | | | |
| Ŭ | 016C | U | | đ | 0111 | dj | | | | |
| Ů | 016E | U | | DŽ | 01C4 | Dz | | | | |
| Ű | 0170 | U | | DZ | 01F1 | Dz | | | | |
| Ų | 0172 | U | | Dž | 01C5 | Dz | | | | |
| ù | 00F9 | u | | Dz | 01F2 | Dz | | | | |
| ú | 00FA | u | | dž | 01C6 | dz | | | | |
| û | 00FB | u | | dz | 01F3 | dz | | | | |
| ū | 016B | u | | LJ | 01C7 | Lj | | | | |
| ŭ | 016D | u | | Lj | 01C8 | Lj | | | | |
| ů | 016F | u | | lj | 01C9 | lj | | | | |
| ű | 0171 | u | | NJ | 01CA | Nj | | | | |
| ų | 0173 | u | | Nj | 01CB | Nj | | | | |

Generic (con't)

| In | UCS | Out | UCS |
|---|---|---|---|
| Ά | 0386 | Α | 0391 |
| ά | 03AC | α | 03B1 |
| ϐ | 03D0 | β | 03B2 |
| Έ | 0388 | Ε | 0395 |
| έ | 03AD | ε | 03B5 |
| ϵ | 03F5 | ε | 03B5 |
| Ή | 0389 | Η | 0397 |
| ή | 03AE | η | 03B7 |
| ϴ | 03F4 | Θ | 0398 |
| ϑ | 03D1 | θ | 03B8 |
| Ί | 038A | Ι | 0399 |
| Ϊ | 03AA | Ι | 0399 |
| ΐ | 0390 | ι | 03B9 |
| ί | 03AF | ι | 03B9 |
| ϊ | 03CA | ι | 03B9 |
| ϰ | 03F0 | κ | 03BA |
| Ό | 038C | Ο | 039F |
| ό | 03CC | ο | 03BF |
| ϖ | 03D6 | π | 03C0 |
| ϱ | 03F1 | ρ | 03C1 |
| ς | 03F2 | ς | 03C2 |
| Ϲ | 03F9 | Σ | 03A3 |

| In | UCS | Out | UCS |
|---|---|---|---|
| Ύ | 038E | Υ | 03A5 |
| Ϋ | 03AB | Υ | 03A5 |
| ϒ | 03D2 | Υ | 03A5 |
| ϓ | 03D3 | Υ | 03A5 |
| ϔ | 03D4 | Υ | 03A5 |
| ΰ | 03B0 | υ | 03C5 |
| ϋ | 03CB | υ | 03C5 |
| ύ | 03CD | υ | 03C5 |
| ϕ | 03D5 | φ | 03C6 |
| Ώ | 038F | Ω | 03A9 |
| ώ | 03CE | ω | 03C9 |
| Ѓ | 0403 | Г | 0413 |
| Ґ | 0490 | Г | 0413 |
| ѓ | 0453 | г | 0433 |
| ґ | 0491 | г | 0433 |
| Ё | 0401 | Е | 0415 |
| Є | 0404 | Е | 0415 |
| ё | 0451 | е | 0435 |
| є | 0454 | е | 0435 |
| Ќ | 040C | К | 041A |
| ќ | 045C | к | 043A |
| Љ | 0409 | Л | 041B |
| љ | 0459 | л | 043B |
| Џ | 040F | Ц | 0426 |
| џ | 045F | ц | 0446 |

FIG. 5C

Russian

| In | UCS | Out | UCS |
|----|------|-----|------|
| Ё  | 0401 | E   | 0415 |
| ё  | 0451 | e   | 0435 |

FIG. 6

Macedonian

| In | UCS | Out | UCS |
|----|-----|-----|-----|
| Ј | 0408 | J | 004A |
| ј | 0458 | j | 006A |
| Ѓ | 0403 | Г | 0413 |
| ѓ | 0453 | г | 0433 |
| Ќ | 040C | К | 041A |
| ќ | 045C | к | 043A |
| Љ | 0409 | Л | 041B |
| љ | 0459 | л | 043B |
| Џ | 040F | Ц | 0426 |
| џ | 045F | ц | 0446 |

FIG. 7

Ukrainian

| In | UCS | Out | UCS |
|---|---|---|---|
| Ï | 00CF | I | 0049 |
| І | 0406 | I | 0049 |
| Ї | 0407 | I | 0049 |
| ï | 00EF | I | 0069 |
| і | 0456 | I | 0069 |
| ї | 0457 | I | 0069 |
| Ґ | 0490 | Г | 0413 |
| ґ | 0491 | г | 0433 |
| Є | 0404 | E | 0415 |
| є | 0454 | e | 0435 |

FIG. 8

Greek

| In | UCS | Out | UCS |
|----|-----|-----|-----|
| Ά | 0386 | Α | 0391 |
| ά | 03AC | α | 03B1 |
| ϐ | 03D0 | β | 03B2 |
| Έ | 0388 | Ε | 0395 |
| έ | 03AD | ε | 03B5 |
| ϵ | 03F5 | ε | 03B5 |
| Ή | 0389 | Η | 0397 |
| ή | 03AE | η | 03B7 |
| ϴ | 03F4 | Θ | 0398 |
| ϑ | 03D1 | θ | 03B8 |
| Ί | 038A | Ι | 0399 |
| Ϊ | 03AA | Ι | 0399 |
| ΐ | 0390 | ι | 03B9 |
| ί | 03AF | ι | 03B9 |
| ϊ | 03CA | ι | 03B9 |
| ϰ | 03F0 | κ | 03BA |
| Ό | 038C | Ο | 039F |
| ό | 03CC | ο | 03BF |
| ϖ | 03D6 | π | 03C0 |
| ϱ | 03F1 | ρ | 03C1 |
| ϲ | 03F2 | ς | 03C2 |
| Ϲ | 03F9 | Σ | 03A3 |
| Ύ | 038E | Υ | 03A5 |
| Ϋ | 03AB | Υ | 03A5 |
| ϒ | 03D2 | Υ | 03A5 |
| ϓ | 03D3 | Υ | 03A5 |
| ϔ | 03D4 | Υ | 03A5 |
| ΰ | 03B0 | υ | 03C5 |
| ϋ | 03CB | υ | 03C5 |
| ύ | 03CD | υ | 03C5 |
| ϕ | 03D5 | φ | 03C6 |
| Ώ | 038F | Ω | 03A9 |
| ώ | 03CE | ω | 03C9 |

FIG. 9

Esperanto (hx-system)

| In | Out | A.E. | UCS | | In | Out | A.E. | UCS |
|---|---|---|---|---|---|---|---|---|
| CH | C | Ĉ | 0108 | | CX | C | Ĉ | 0108 |
| Ch | C | Ĉ | 0108 | | Cx | C | Ĉ | 0108 |
| ch | c | ĉ | 0109 | | cx | c | ĉ | 0109 |
| GH | G | Ĝ | 011C | | GX | G | Ĝ | 011C |
| Gh | G | Ĝ | 011C | | Gx | G | Ĝ | 011C |
| gh | g | ĝ | 011D | | gx | g | ĝ | 011D |
| HH | H | Ĥ | 0124 | | HX | H | Ĥ | 0124 |
| Hh | H | Ĥ | 0124 | | Hx | H | Ĥ | 0124 |
| hh | h | ĥ | 0125 | | hx | x | ĥ | 0125 |
| JH | J | Ĵ | 0134 | | JX | J | Ĵ | 0134 |
| Jh | J | Ĵ | 0134 | | Jx | J | Ĵ | 0134 |
| jh | j | ĵ | 0135 | | jx | j | ĵ | 0135 |
| SH | S | Ŝ | 015C | | SX | S | Ŝ | 015C |
| Sh | S | Ŝ | 015C | | Sx | S | Ŝ | 015C |
| sh | s | ŝ | 015D | | sx | s | ŝ | 015D |

| In | Out | A.E. | UCS |
|----|-----|------|------|
| CH | C | Č | 010C |
| Ch | C | Č | 010C |
| Ch | c | č | 010D |

ShZh

| In | Out | A.E. | UCS |
|----|-----|------|------|
| SH | S | Š | 0160 |
| Sh | S | Š | 0160 |
| sh | s | š | 0161 |
| ZH | Z | Ž | 017D |
| Zh | Z | Ž | 017D |
| zh | z | ž | 017E |

FIG. 11

Croatian

| In | UCS | Out |
|---|---|---|
| Ć | 0106 | C |
| Č | 010C | C |
| ć | 0107 | c |
| č | 010D | c |
| Š | 0160 | S |
| š | 0161 | s |
| Ž | 017D | Z |
| ž | 017E | z |
| Đ | 0110 | Dj |
| đ | 0111 | dj |
| Dž | 01C4 | Dz |
| Dž | 01C5 | Dz |
| dž | 01C6 | dz |
| LJ | 01C7 | Lj |
| Lj | 01C8 | Lj |
| lj | 01C9 | lj |
| NJ | 01CA | Nj |
| Nj | 01CB | Nj |
| nj | 01CC | nj |

FIG. 12

Catalan

| In | UCS | Out |
|---|---|---|
| À | 00C0 | A |
| à | 00E0 | a |
| Ç | 00C7 | C |
| ç | 00E7 | c |
| È | 00C8 | E |
| É | 00C9 | E |
| è | 00E8 | e |
| é | 00E9 | e |
| Í | 00CD | I |
| Ï | 00CF | I |
| í | 00ED | i |
| ï | 00EF | i |
| L· | 013F | L |
| l· | 0140 | l |
| Ò | 00D2 | O |
| Ó | 00D3 | O |
| ò | 00F2 | o |
| ó | 00F3 | o |
| Ù | 00D9 | U |
| Ú | 00DA | U |
| Ü | 00DC | U |
| ù | 00F9 | u |
| ú | 00FA | u |
| ü | 00FC | u |

FIG. 13

Serbian

| In | UCS | Out | | In | UCS | Out | | In | UCS | Out |
|----|-----|-----|---|----|-----|-----|---|----|-----|-----|
| А | 0410 | A | | К | 041A | K | | Ж | 0416 | Z |
| а | 0430 | a | | к | 043A | k | | З | 0417 | Z |
| Б | 0411 | B | | Л | 041B | L | | ж | 0436 | z |
| б | 0431 | b | | л | 043B | l | | з | 0437 | z |
| Ћ | 040B | C | | М | 041C | M | | Ђ | 0402 | Dj |
| Ц | 0426 | C | | м | 043C | m | | ђ | 0452 | dj |
| Ч | 0427 | C | | Н | 041D | N | | Џ | 040F | Dz |
| ћ | 045B | c | | н | 043D | n | | џ | 045F | dz |
| ц | 0446 | c | | О | 041E | O | | Љ | 0409 | Lj |
| ч | 0447 | c | | о | 043E | o | | љ | 0459 | lj |
| Д | 0414 | D | | П | 041F | P | | Њ | 040A | Nj |
| д | 0434 | d | | п | 043F | p | | њ | 045A | nj |
| Е | 0415 | E | | Р | 0420 | R | | | | |
| е | 0435 | e | | р | 0440 | r | | | | |
| Ф | 0424 | F | | С | 0421 | S | | | | |
| ф | 0444 | f | | Ш | 0428 | S | | | | |
| Г | 0413 | G | | с | 0441 | s | | | | |
| г | 0433 | g | | ш | 0448 | s | | | | |
| Х | 0425 | H | | Т | 0422 | T | | | | |
| х | 0445 | h | | т | 0442 | t | | | | |
| И | 0418 | I | | У | 0423 | U | | | | |
| и | 0438 | i | | у | 0443 | u | | | | |
| Ј | 0408 | J | | В | 0412 | V | | | | |
| ј | 0458 | j | | в | 0432 | v | | | | |

FIG. 14

French

| In | UCS | Out | | In | UCS | Out |
|---|---|---|---|---|---|---|
| À | 00C0 | A | | Ò | 00D2 | O |
| Á | 00C1 | A | | Ó | 00D3 | O |
| Â | 00C2 | A | | Ô | 00D4 | O |
| à | 00E0 | a | | ò | 00F2 | o |
| á | 00E1 | a | | ó | 00F3 | o |
| â | 00E2 | a | | ô | 00F4 | o |
| Ç | 00C7 | C | | Ù | 00D9 | U |
| ç | 00E7 | c | | Ú | 00DA | U |
| È | 00C8 | E | | Û | 00DB | U |
| É | 00C9 | E | | Ü | 00DC | U |
| Ê | 00CA | E | | ù | 00F9 | u |
| Ë | 00CB | E | | ú | 00FA | u |
| è | 00E8 | e | | û | 00FB | u |
| é | 00E9 | e | | ü | 00FC | u |
| ê | 00EA | e | | Æ | 00C6 | A |
| ë | 00EB | e | | æ | 00E6 | a |
| Ì | 00CC | I | | Œ | 0152 | O |
| Í | 00CD | I | | œ | 0153 | o |
| Î | 00CE | I | | | | |
| Ï | 00CF | I | | | | |
| ì | 00EC | i | | | | |
| í | 00ED | i | | | | |
| î | 00EE | i | | | | |
| ï | 00EF | i | | | | |

FIG. 15

Italian

| In | UCS | Out |
|----|------|-----|
| À  | 00C0 | A   |
| à  | 00E0 | a   |
| È  | 00C8 | E   |
| è  | 00E8 | e   |
| Í  | 00CD | I   |
| ì  | 00EC | i   |
| Ò  | 00D2 | O   |
| ò  | 00F2 | o   |
| Ù  | 00D9 | U   |
| ù  | 00F9 | u   |

FIG. 16

Portuguese

| In | UCS | Out |
|---|---|---|
| À | 00C0 | A |
| Á | 00C1 | A |
| Â | 00C2 | A |
| Ã | 00C3 | A |
| à | 00E0 | a |
| á | 00E1 | a |
| â | 00E2 | a |
| ã | 00E3 | a |
| Ç | 00C7 | C |
| ç | 00E7 | c |
| É | 00C9 | E |
| Ê | 00CA | E |
| é | 00E9 | e |
| ê | 00EA | e |
| Í | 00CD | I |
| í | 00ED | i |
| Ó | 00D3 | O |
| Ô | 00D4 | O |
| Õ | 00D5 | O |
| ó | 00F3 | o |
| ô | 00F4 | o |
| õ | 00F5 | o |
| Ú | 00DA | U |
| Ü | 00DC | U |
| ú | 00FA | u |
| ü | 00FC | u |

FIG. 17

Romanian

| In | UCS | Out |
|---|---|---|
| Â | 00C2 | A |
| Ă | 0102 | A |
| â | 00E2 | a |
| ă | 0103 | a |
| Î | 00CE | I |
| î | 00EE | i |
| Ş | 015E | S |
| Ș | 0218 | S |
| ş | 015F | s |
| ș | 0219 | s |
| Ţ | 0162 | T |
| Ț | 021A | T |
| ţ | 0163 | t |
| ț | 021B | t |

FIG. 18

Spanish

| In | UCS | Out |
|---|---|---|
| À | 00C0 | A |
| Á | 00C1 | A |
| à | 00E0 | a |
| á | 00E1 | a |
| È | 00C8 | E |
| É | 00C9 | E |
| è | 00E8 | e |
| é | 00E9 | e |
| Ì | 00CC | I |
| Í | 00CD | I |
| ì | 00EC | i |
| í | 00ED | i |
| Ñ | 00D1 | N |
| ñ | 00F1 | n |
| Ò | 00D2 | O |
| Ó | 00D3 | O |
| ò | 00F2 | o |
| ó | 00F3 | o |
| Ù | 00D9 | U |
| Ú | 00DA | U |
| ù | 00F9 | u |
| ú | 00FA | u |

FIG. 19

Dutch

| In | UCS | Out |
|---|---|---|
| À | 00C0 | A |
| Á | 00C1 | A |
| Ä | 00C4 | A |
| à | 00E0 | a |
| á | 00E1 | a |
| ä | 00E4 | a |
| È | 00C8 | E |
| É | 00C9 | E |
| Ê | 00CA | E |
| Ë | 00CB | E |
| è | 00E8 | e |
| é | 00E9 | e |
| ê | 00EA | e |
| ë | 00EB | e |
| Í | 00CD | I |
| Ï | 00CF | I |
| í | 00ED | i |
| ï | 00EF | i |
| Ó | 00D3 | O |
| Ö | 00D6 | O |
| ó | 00F3 | o |
| ö | 00F6 | o |
| Ú | 00DA | U |
| Ü | 00DC | U |
| ú | 00FA | u |
| ü | 00FC | u |
| Ÿ | 0178 | Ij |
| IJ | 0132 | Ij |
| ÿ | 00FF | ij |
| ij | 0133 | ij |

FIG. 20

Danish

| In | UCS | Out |
|----|------|-----|
| É  | 00C9 | E   |
| é  | 00E9 | e   |
| Å  | 00C5 | Aa  |
| Æ  | 00C6 | Ae  |
| Ø  | 00D8 | Oe  |
| å  | 00E5 | aa  |
| æ  | 00E6 | ae  |
| ø  | 00F8 | oe  |
| Œ  | 0152 | Oe  |
| œ  | 0153 | oe  |

FIG. 21

English

| In | UCS | Out |
|---|---|---|
| Æ | 00C6 | Ae |
| æ | 00E6 | ae |
| Œ | 0152 | Oe |
| œ | 0153 | oe |

Swedish

| In | UCS | Out |
|---|---|---|
| É | 00C9 | E |
| é | 00E9 | e |
| Ü | 00DC | U |
| ü | 00FC | u |

German

| In | UCS | Out |
|---|---|---|
| ß | 00DF | ss |

Dutch-Y

| In | UCS | Out |
|---|---|---|
| Ÿ | 0178 | Ij |
| ÿ | 00FF | ij |

German Umlaut

| In | UCS | Out |
|---|---|---|
| Ä | 00C4 | Ae |
| ä | 00E4 | ae |
| Ö | 00D6 | Oe |
| ö | 00F6 | oe |
| Ü | 00DC | Ue |
| ü | 00FC | ue |

FIG. 22

A-Umlaut

| In | UCS | Out |
|---|---|---|
| Ä | 00C4 | A |
| ä | 00E4 | a |

O-Umlaut

| In | UCS | Out |
|---|---|---|
| Ö | 00D6 | O |
| ö | 00F6 | o |

U-Umlaut

| In | UCS | Out |
|---|---|---|
| Ü | 00DC | U |
| ü | 00FC | u |

Y-Umlaut

| In | UCS | Out |
|---|---|---|
| Ÿ | 0178 | Y |
| ÿ | 00FF | y |

FIG. 23

Icelandic

| In | UCS | Out |
|---|---|---|
| Á | 00C1 | A |
| á | 00E1 | a |
| Ð | 00D0 | D |
| ð | 00F0 | d |
| É | 00C9 | E |
| é | 00E9 | e |
| Í | 00CD | I |
| í | 00ED | i |
| Ó | 00D3 | O |
| Ö | 00D6 | O |
| ó | 00F3 | o |
| ö | 00F6 | o |
| Ú | 00DA | U |
| ú | 00FA | u |
| Ý | 00DD | Y |
| ý | 00FD | y |
| Æ | 00C6 | Ae |
| æ | 00E6 | ae |
| Œ | 0152 | Oe |
| œ | 0153 | oe |
| Þ | 00DE | Th |
| þ | 00FE | th |

FIG. 24

Czech

| In | UCS | Out |
|---|---|---|
| Á | 00C1 | A |
| á | 00E1 | a |
| Č | 010C | C |
| č | 010D | c |
| Ď | 010E | D |
| ď | 010F | d |
| É | 00C9 | E |
| Ě | 011A | E |
| é | 00E9 | e |
| ě | 011B | e |
| Í | 00CD | I |
| í | 00ED | i |
| Ň | 0147 | N |
| ň | 0148 | n |
| Ó | 00D3 | O |
| ó | 00F3 | o |
| Ř | 0158 | R |
| ř | 0159 | r |
| Š | 0160 | S |
| š | 0161 | s |
| Ť | 0164 | T |
| ť | 0165 | t |
| Ú | 00DA | U |
| Ů | 016E | U |
| ú | 00FA | u |
| ů | 016F | u |
| Ý | 00DD | Y |
| ý | 00FD | y |
| Ž | 017D | Z |
| ž | 017E | z |

FIG. 25

Latvian

| In | UCS | Out | | In | UCS | Out |
|---|---|---|---|---|---|---|
| Ā | 0100 | A | | Ū | 016A | U |
| ā | 0101 | a | | ū | 016B | u |
| Č | 010C | C | | Ž | 017D | Z |
| č | 010D | c | | ž | 017E | z |
| Ē | 0112 | E | | Dž | 01C4 | Dz |
| ē | 0113 | e | | DZ | 01F1 | Dz |
| Ģ | 0122 | G | | Dž | 01C5 | Dz |
| ģ | 0123 | g | | Dz | 01F2 | Dz |
| Ī | 012A | I | | dž | 01C6 | dz |
| ī | 012B | i | | dz | 01F3 | dz |
| Ķ | 0136 | K | | | | |
| ķ | 0137 | k | | | | |
| Ļ | 013B | L | | | | |
| ļ | 013C | l | | | | |
| Ņ | 0145 | N | | | | |
| ņ | 0146 | n | | | | |
| Ŗ | 0156 | R | | | | |
| ŗ | 0157 | r | | | | |
| Š | 0160 | S | | | | |
| š | 0161 | s | | | | |

FIG. 26

Lithuanian

| In | UCS | Out |
|---|---|---|
| Ą | 0104 | A |
| ą | 0105 | a |
| Č | 010C | C |
| č | 010D | c |
| Ė | 0116 | E |
| Ę | 0118 | E |
| ė | 0117 | e |
| ę | 0119 | e |
| Į | 012E | I |
| į | 012F | i |
| Š | 0160 | S |
| š | 0161 | s |
| Ū | 016A | U |
| Ų | 0172 | U |
| ū | 016B | u |
| ų | 0173 | u |
| Ž | 017D | Z |
| ž | 017E | z |

FIG. 27

Polish

| In | UCS | Out |
|---|---|---|
| Ą | 0104 | A |
| ą | 0105 | a |
| Ć | 0106 | C |
| ć | 0107 | c |
| Ę | 0118 | E |
| ę | 0119 | e |
| Ł | 0141 | L |
| ł | 0142 | l |
| Ń | 0143 | N |
| ń | 0144 | n |
| Ó | 00D3 | O |
| ó | 00F3 | o |
| Ś | 015A | S |
| ś | 015B | s |
| Ź | 0179 | Z |
| Ż | 017B | Z |
| ź | 017A | z |
| ż | 017C | z |

FIG. 28

Slovakian

| In | UCS | Out |
|---|---|---|
| Á | 00C1 | A |
| Ä | 00C4 | A |
| á | 00E1 | a |
| ä | 00E4 | a |
| Č | 010C | C |
| č | 010D | c |
| Ď | 010E | D |
| ď | 010F | d |
| É | 00C9 | E |
| é | 00E9 | e |
| Í | 00CD | I |
| í | 00ED | i |
| Ĺ | 0139 | L |
| Ľ | 013D | L |
| ĺ | 013A | l |
| ľ | 013E | l |
| Ñ | 00D1 | N |
| Ň | 0147 | N |
| ñ | 00F1 | n |
| ň | 0148 | n |
| Ó | 00D3 | O |
| Ô | 00D4 | O |
| ó | 00F3 | o |
| ô | 00F4 | o |

| In | UCS | Out |
|---|---|---|
| Ŕ | 0154 | R |
| ŕ | 0155 | r |
| Š | 0160 | S |
| š | 0161 | s |
| Ť | 0164 | T |
| ť | 0165 | t |
| Ú | 00DA | U |
| ú | 00FA | u |
| Ý | 00DD | Y |
| ý | 00FD | y |
| Ž | 017D | Z |
| ž | 017E | z |
| DŽ | 01C4 | Dz |
| DZ | 01F1 | Dz |
| Dž | 01C5 | Dz |
| Dz | 01F2 | Dz |
| dž | 01C6 | dz |
| dz | 01F3 | dz |

FIG. 29

Slovenian

| In | UCS | Out |
|---|---|---|
| Č | 010C | C |
| č | 010D | c |
| Š | 0160 | S |
| š | 0161 | s |
| Ž | 017D | Z |
| ž | 017E | z |

FIG. 30

Estonian

| In | UCS | Out |
|---|---|---|
| Ä | 00C4 | A |
| ä | 00E4 | a |
| Č | 010C | C |
| č | 010D | c |
| Õ | 00D5 | O |
| Ö | 00D6 | O |
| õ | 00F5 | o |
| ö | 00F6 | o |
| Š | 0160 | S |
| š | 0161 | s |
| Ü | 00DC | U |
| ü | 00FC | u |
| Ž | 017D | Z |
| ž | 017E | z |

FIG. 31

Hungarian

| In | UCS | Out |
|---|---|---|
| Á | 00C1 | A |
| á | 00E1 | a |
| É | 00C9 | E |
| é | 00E9 | e |
| Í | 00CD | I |
| í | 00ED | i |
| Ó | 00D3 | O |
| Ô | 00D4 | O |
| Ö | 00D6 | O |
| Ő | 0150 | O |
| ó | 00F3 | o |
| ô | 00F4 | o |
| ö | 00F6 | o |
| ő | 0151 | o |
| Ú | 00DA | U |
| Û | 00DB | U |
| Ü | 00DC | U |
| Ű | 0170 | U |
| ú | 00FA | u |
| û | 00FB | u |
| ü | 00FC | u |
| ű | 0171 | u |

FIG. 32

Esperanto

| In | UCS | Out |
|---|---|---|
| Ĉ | 0108 | C |
| ĉ | 0109 | c |
| Ĝ | 011C | G |
| ĝ | 011D | g |
| Ĥ | 0124 | H |
| ĥ | 0125 | h |
| Ĵ | 0134 | J |
| ĵ | 0135 | j |
| Ŝ | 015C | S |
| ŝ | 015D | s |
| Ŭ | 016C | U |
| ŭ | 016D | u |

FIG. 33

Turkish

| In | UCS | Out |
|---|---|---|
| Ç | 00C7 | C |
| ç | 00E7 | c |
| Ö | 00D6 | O |
| ö | 00F6 | o |
| Ğ | 011E | G |
| ğ | 011F | g |
| İ | 0130 | I |
| ı | 0131 | i |
| Ş | 015E | S |
| ş | 015F | s |
| Û | 00DB | U |
| Ü | 00DC | U |
| û | 00FB | u |
| ü | 00FC | u |

FIG. 34

SIMPLIFYING QUERY TERMS WITH TRANSLITERATION

BACKGROUND

This invention relates to the handling of language uncertainty in processing search queries and searches over a corpus including documents and other searchable resources, where the queries and resources can be expressed in any one of a number of different languages.

A search engine indexes documents and provides a means to search for documents whose contents are indexed by the search engine. Documents are written in many different languages; some documents have content in multiple languages. A variety of characters are used to express the words of these languages: the Latin alphabet (i.e., the 26 unaccented characters from A to Z, upper and lower case), diacritics (i.e., accented characters), ligatures (e.g., Æ, β, Œ), Cyrillic characters and others.

Unfortunately the ability and ease of producing these characters varies greatly from device to device. Both the authors of content and the users of search engines may not be able to produce conveniently characters that they would prefer. Instead, users of such devices will often provide a character or character sequence that is a close substitute. For example, AE may be provided in lieu of Æ. Moreover the conventions of such substitutions vary among languages and users. For example, some users who search for AE may prefer to see results including Æ as well.

One approach for addressing this issue in a search engine is to process the indexed content to remove accents and convert special characters into a standard set of characters. This approach removes information from the index, making it impossible to retrieve only specific accented instances of a word. This approach also suffers from language agnosticism which is insensitive to users whose expectations are shaped by the conventions of their particular language.

SUMMARY

This specification discloses various embodiments of technologies for using the terms of a search query. Embodiments feature methods, systems, apparatus, including computer program product apparatus. Each of these will be described in this summary be reference to the methods, for which there are corresponding systems and apparatus.

In general, in one aspect, methods feature receiving from a user through a user interface a search query comprising one or more query terms, the user interface having an interface language, the interface language being a natural language; and determining a query language for the query from the query terms and the interface language, the query language being a natural language. These and other embodiments can optionally include one or more of the following features. The methods include determining a score for each one of multiple languages, the score indicating a likelihood that the query language is that one of the multiple languages. The methods include using the query language to select one or more mappings and using the selected one or more mappings to simplify each query term to a corresponding simplified query term; and applying each simplified query term to a synonyms map to identify possible synonyms with which to augment the search query. The methods include determining a score for each one of multiple languages, the score indicating a likelihood that the query language is that one of the multiple languages.

In general, in another aspect, methods feature receiving from a user through a user interface a search query made up of one or more query terms, the user interface having an interface language, the interface language being a natural language; using the interface language to select one or more mappings and using the selected one or more mappings to simplify each query term to a corresponding simplified query term; and applying each simplified query term to a synonyms map to identify possible synonyms with which to augment the search query.

In general, in another aspect, methods feature generating a synonyms map from a corpus of documents, each document having attributed to it a document language, the document languages each being a natural language; wherein the synonyms map maps each of a plurality of keys to one or more corresponding variants; and each variant is associated with one or more of the document languages. These and other embodiments can optionally include one or more of the following features. The methods include for each associated language, each variant is associated with a score indicating a relative frequency of the variant among all variants for the associated language for the same key. The attribution of a document language to each document is determined automatically.

In general, in another aspect, methods feature generating a synonyms map from a corpus of documents by applying a first collection of language-dependent mappings to words in the corpus to generate keys for the map, each document having a document language attributed to it, the document language attributed to each document being used to determine the language-dependent mapping applied to words the document. These and other embodiments can optionally include one or more of the following features. The methods include generating a simplified query term from each query term in a search query by applying a second collection of language-dependent mappings to each query term, the search query having an query language attributed to it, the query language attributed to the search query being used to determine the language-dependent mapping applied to each query term. The first collection of language-dependent mappings is different from the second collection of language-dependent mappings.

In general, in another aspect, methods feature generating a synonyms map from a corpus of documents by applying a first collection of language-dependent mappings to words in the corpus to generate keys for the map, each document having a document language attributed to it, the document language attributed to each document being used to determine the language-dependent mapping applied to words the document; generating simplified query terms from a search query by applying a second collection of language-dependent mappings to query terms in the search query, the search query having an query language attributed to it, the query language attributed to the search query being used to determine the language-dependent mapping applied to the query terms; wherein the search query includes a first query term, the first query term being mapped to a first simplified query term by the applied language-dependent mapping from the second collection of language-dependent mappings determined by the query language, the first query term being mapped to a first key by the language-dependent mapping in the first collection of language-dependent mappings determined by to the query language, and the first simplified query term is different from the first key. These and other embodiments can optionally include one or more of the following features. The methods include attributing the interface language to the query as the query language.

In general, in another aspect, methods feature receiving from a user through a user interface a search query that includes a query term, the search query having attributed to it a query language; deriving a simplified query term from the query term; and identifying one or more potential synonyms for the query term by looking up the simplified query term in a synonyms map, the synonyms map mapping each of a plurality of keys to one or more corresponding variants, each variant being a word associated with one or more document languages, and each variant being associated for each associated language with a variant-language score indicating a relative frequency of the variant among all variants for the associated language for the same key. These and other embodiments can optionally include one or more of the following features. The methods include using the attributed query language and the variant-language scores of one or more variants for the simplified query term to select variants to use in augmenting the search query. The methods include attributing the interface language to the query as the query language. Where the search query has attributed to it multiple query languages, each with a respective query-language score, the methods further include using (a) the query-language scores and (b) the variant-language scores of one or more variants for the simplified query term to select variants to use in augmenting the search query. Using the query-language scores and the variant-language scores includes summing over all languages the product for each language of the query-language score for the language and the variant-language score for the language.

In general, in another aspect, methods feature receiving from a user through a user interface a search query made up of one or more query terms; and receiving an indication of a user preference to apply transliteration in simplifying the query terms of the search query. These and other embodiments can optionally include one or more of the following features. The methods include applying transliteration in simplifying the query terms of the search query to generate simplified query terms if the user preference is to apply transliteration and otherwise not applying transliteration in simplifying the query terms of the search query to generate simplified query terms; and using the simplified query terms to identify synonyms to use in augmenting the search query. The indication of a user preference to apply transliteration in simplifying the search query is a user selection of one of a number of particular interface languages. The methods include receiving from a user through a user interface a search query made up of one or more query terms; applying transliteration in simplifying the query terms of the search query to generate simplified query terms; and using the simplified query terms to identify synonyms to use in augmenting the search query.

In general, in another aspect, methods feature receiving from a user through a user interface a search query made up of one or more original query terms for searching a collection of documents, the user interface having a user interface language; identify the user interface language as a small language or not a small language, a small language being a natural language having a relatively small representation in the collection of documents; simplifying each query term to a simplified form; and if the user interface language is a small language, for each original query term that has a simplified form that is different from the original term, using the original query term as-is and not providing any synonyms for the query term, and for each original query term that is identical to its simplified form, using the simplified form to identify synonyms for the original query term for use in augmenting the search query. These and other embodiments can option-ally include one or more of the following features. Simplifying each query term includes transliterating.

Particular embodiments of the invention can be implemented to realize one or more of the following advantages. A system can correctly add appropriate accents to words in Spanish or Portuguese, where the accents are different in each language. A system can correctly add accents to words in a language different from the language of the user interface with which a user is interacting. A system can transliterate in appropriate circumstances. A system can avoid adding unnecessary diacritical variants to a search query, increasing the likelihood that search results will be in a language desired by the user.

The details of one or more embodiments of the invention are set forth in the accompanying drawings and the description below. Other features, aspects, and advantages of the invention will be apparent from the description and drawings, and from the claims.

BRIEF DESCRIPTION OF THE DRAWINGS

FIG. 4 is an illustration of a synonyms map.

FIGS. 5A, 5B, and 5C and 6-34 illustrate groups of conversion maps.

Like reference numbers and designations in the various drawings indicate like elements.

DETAILED DESCRIPTION

Figure 1:
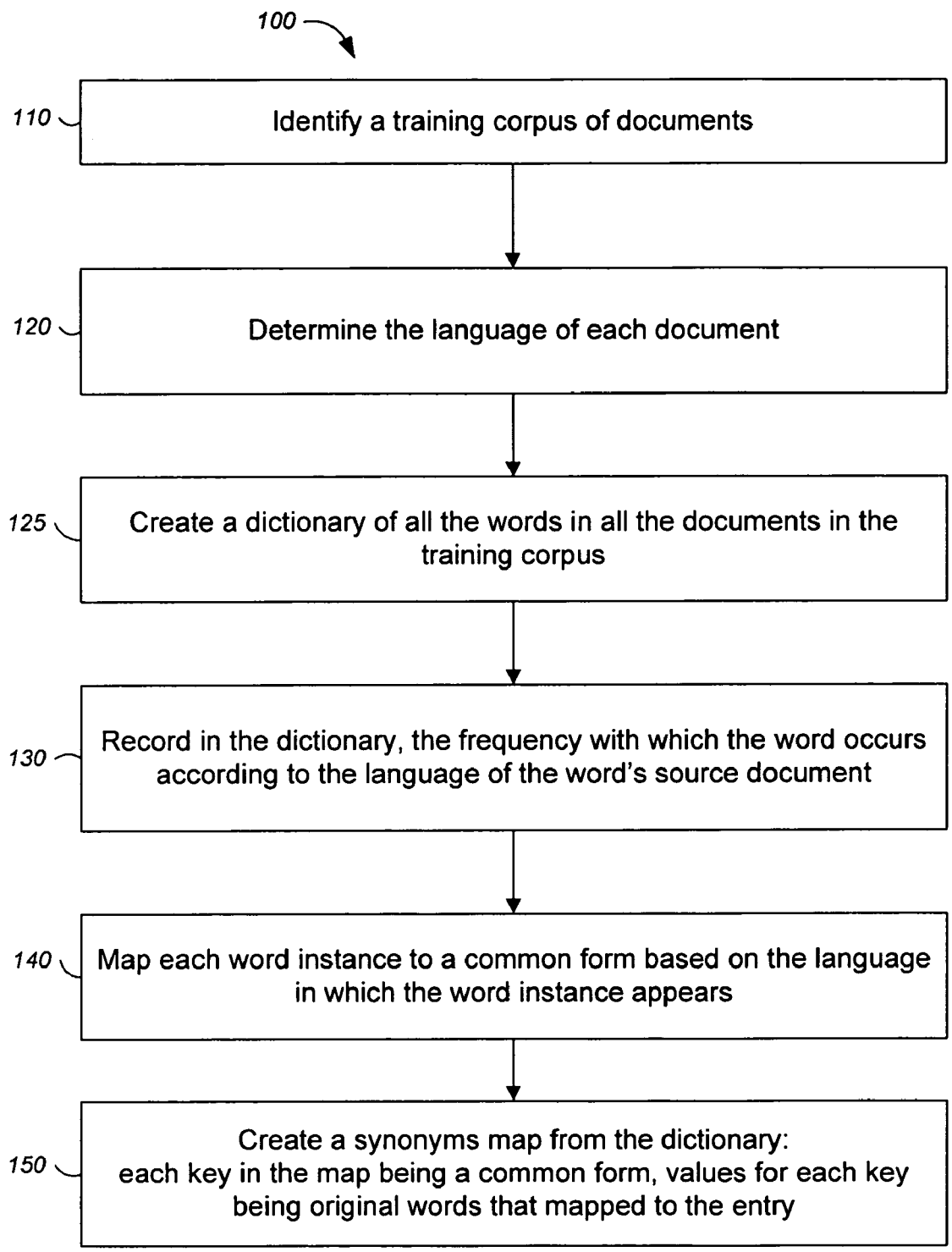
FIG. 1 is a flowchart of a process for building a synonyms map.

As shown in FIG. 1, a process 100 creates a synonyms map from a corpus of documents. The documents can be HTML (Hypertext Markup Language) documents, PDF (Portable Document Format) documents, text documents, word processing documents (e.g., Microsoft® Word documents), Usenet articles, or any other kinds of documents having text content, including metadata content. The process 100 can also be applied to other kinds of text-searchable resources, e.g., media resources identified by metadata.

The synonyms map contains common-form words as keys, each of which is associated with one or more variants. For example, consider a simple corpus in which only two languages are found: French and English. If "elephant" is a common-form entry in the synonyms map, then the variants "elephant", "éléphant" and "eléphant" would be associated with that entry as values, if these variants are found in the corpus. Each value also includes additional information: the languages of the documents in which instances of the variant appear, and the number of times the variant appears in that language. Continuing the example, "eléphant" might be found in the corpus 90 times among documents recognized as being English and 300 times among documents recognized as being French.

Process 100 operates on a training corpus of documents (step 110). The training corpus of documents is ideally a collection of documents representative of documents contained in a search corpus. Alternatively, the training corpus and the search corpus can be the same, or the training corpus can be a snapshot of, or an extract from, the search corpus. The training corpus should contain documents from all languages represented in the search corpus. The training corpus should contain a sufficient number of documents in each language so that the documents contain a significant portion of the words found within all documents of the language in the search corpus.

In one implementation, each document in the training and search corpus is encoded in a known and consistent character encoding, such as 8-bit Uniform Transformation Format (UTF-8), which can encode any character in the Unicode standard (i.e., most known characters and ideographs). Documents that are in an inconsistent or unknown encoding are subject to encoding conversion. In one implementation, the corpus is a collection of documents from the Web found by a web crawler.

The language of each document in the training corpus is identified. Determining the language of each document can be explicitly part of process 100 (step 120). Alternatively the document's language can be part of the information contained in the training corpus. The language of a document or word does not necessarily correspond simply to natural languages. A language can include any distinguishable linguistic system defined by its orthography, syntax, lexicon or morphology. For example, Roman Indic, a roman transliterated equivalent of a group of languages (e.g., Bengali and Hindi), can be considered a separate language from either Bengali and Hindi in their conventional orthographic script.

The document language detection process uses statistical learning theories. In one implementation, it uses Naive Bayes classification models to calculate the likelihoods of possible classes and predicts the class that has the maximum likelihood. A class is a language/encoding pair that a document can be expressed in, for example, English/ASCII, Japanese/Shift-JIS, or Russian/UTF8. Some languages correspond to multiple classes because they can be encoded in multiple encodings, while some encodings correspond to multiple classes because they can be used to express multiple languages.

The Naive Bayes models are used to determine the most likely class or classes for a page of text based on the text and (optionally) a Universal Resource Locator (URL) of the page of text.

The encoding of a page of text is determined using a Naive Bayes model that predicts the maximum likelihood encoding based on pairings of the bytes that represent the text. If the URL of the page of text is available, the model also factors in the probability of a specific encoding given that the text came from a certain top level domain (i.e., the last part of the Internet domain name).

The text is converted from its original encoding into Unicode when performing language detection, and the language detection is performed using features. Typically, natural language words are the best features to use, so the text is segmented into words. A Naive Bayes model computes probabilities of individual words given a language and predicts the maximum likelihood language for the text based on the probabilities.

The Naive Bayes models can be trained and tested using a large sample of electronic documents in various encodings and languages. Training the Naive Bayes model is essentially calculating the probability of a feature given a language.

Document language identification is further described in U.S. patent application Ser. No. 60/793,708, entitled Identifying a Property of a Document, to inventor Xin Liu, filed on Apr. 19, 2006, the entire disclosure of which is incorporated here by reference.

The process 100 creates a dictionary containing each unique word found among all the documents in the training corpus (step 125). Each instance of a given word found in the corpus is counted according to the identified language of the document it was found in. The frequency of each word in each document language is recorded in the dictionary. For example, if hello is encountered 200 times—150 times within documents identified as English documents and 50 times within documents identified as German documents—then the hello dictionary entry records that hello was found in English and German documents and that it was found 150 and 50 times, respectively.

For each language, a pre-determined blacklist of characters can be defined. The blacklist of characters is a list of characters which would not normally occur in documents in that language. The blacklist of characters does not necessarily reflect strict inherent characteristics of the language. For example, 'w' does not occur in French words so it can be added to the French blacklist. However, borrowed and foreign words that contain a 'w' occur in French documents often enough that 'w' can be excluded from the French blacklist. The list can be determined manually in whole or in part. Alternatively, occurrences of characters in documents known to be in a particular language can be statistically analyzed to inform the manual process or to produce a blacklist of characters automatically.

Process 100 can use the blacklist of characters to determine whether a word found in the training corpus appears to violate the conventional rules of the language. Such a word is ignored, i.e., it is not inserted into the dictionary. For example, if "QqWwXxYy" is a blacklist of characters for Hungarian, then "xylophone" is ignored when it is found in a Hungarian document.

The process 100 maps each word entry in the dictionary to a common form for each language in which the word appears (step 130). Generally, the common form is a word that conforms to a simplified, standardized, canonical or otherwise consistent orthography, for example, words expressed without the use of accented characters. Process 100 maps each word according to pre-defined and language-specific mappings. For example, a mapping converts "éléphant", found in a document identified as French, to "elephant".

A word is mapped to a common form according to language-specific mappings. Every language-specific mapping is a collection of one or more character conversion maps. Each conversion map specifies one or more input characters and one or more output characters to which the one or more input characters are mapped. The process 100 replaces the maximal sequence (or prefix) of characters matching the input of a conversion map with the map's one or more output characters. Other characters are copied unchanged. For any given word, the result of this character conversion process generates the word's common form. A data structure designed to facilitate longest-prefix matching can be used to store language-specific mappings (e.g., a trie or prefix tree).

For example, "воДКка" from a Russian document is mapped to "воДКка" (no change), while "воДКка" in a Serbian document is mapped to "vodka". Language specific conversion is intended to capture the expectations of the writers of those languages. This reflects that while Russian-writers are likely to provide "воДКка", Serbian practice suggests that Cyrillic words are more often given as their Roman-transliterated equivalent in search queries.

A conversion map that specifies more than one input character is a special case of conversion for mapping words that contain collapsible digraphs. Collapsible digraphs are two-character combinations that, in some languages, can be represented as a single, often accented, character. For example, German convention suggests that if 'Ü' cannot be typeset, then 'Ue' or 'UE' is a suitable substitute. Therefore a German document can spell the word "über" as "ueber". During mapping to a common form, a two-character conversion map will often collapse the collapsible digraph and de-accent the result. For example, in one implementation, German conversion maps convert both "ueber" and "über" to "uber".

The process 100 creates a synonyms map (step 150) from: the common form mappings, the dictionary entries, and the entries' associated language statistics. Each distinct common form, as derived above, becomes a key in the synonyms map. Dictionary entries that map to a given key, using a mapping for each of the entry's languages, become the key's values. In the synonyms map, the dictionary entries will be called variants. Generally, each key is associated with multiple variants, each of which is associated with the variant's language statistics. Given the mapping in the above example, "воДКа" is one key whose value refers to at least one variant "воДКа", associated with Russian (but not Serbian). Furthermore, "vodka" is another key whose value refers to at least one variant "воДКа" associated with Serbian (but not Russian).

Figure 2:
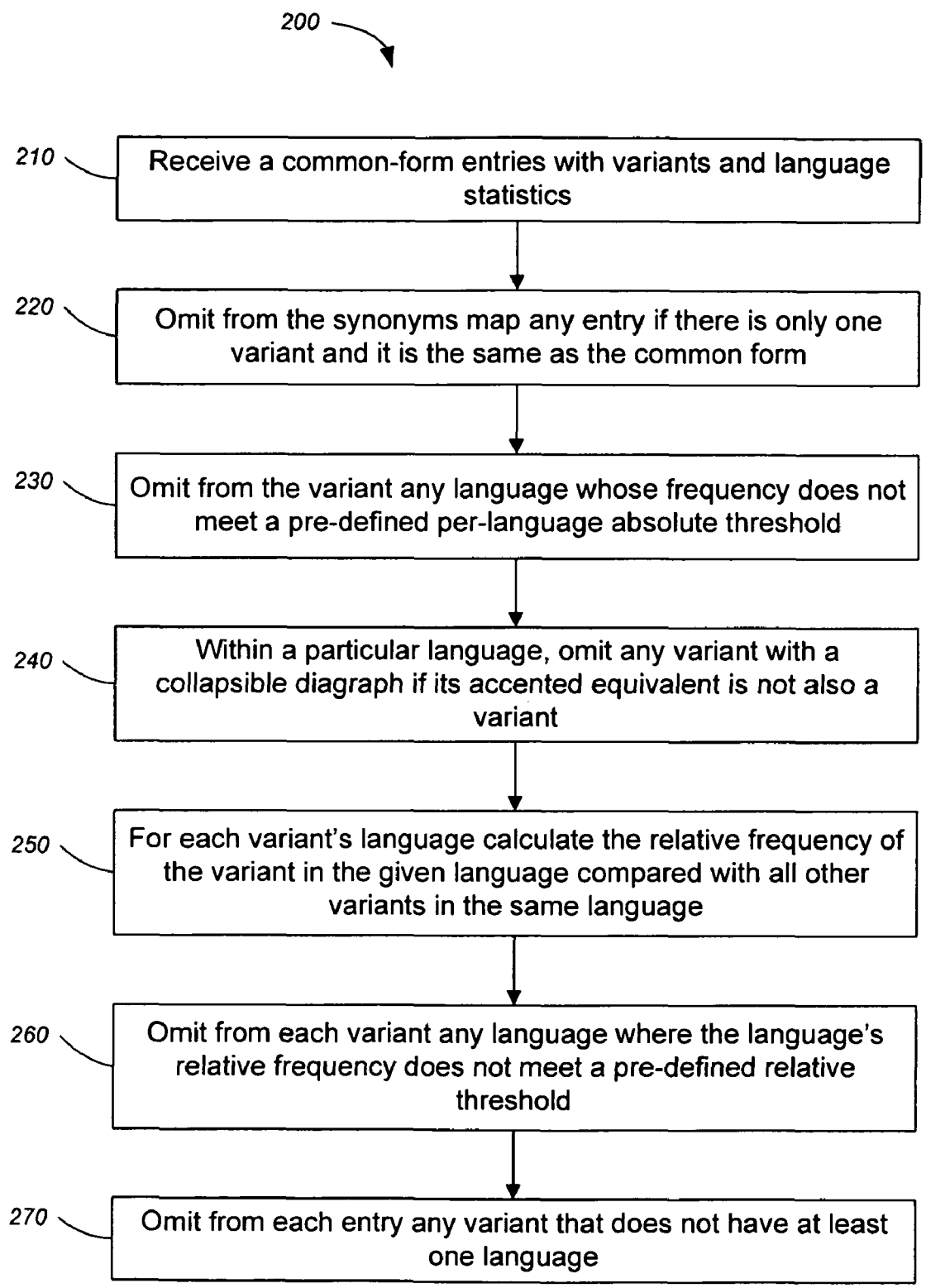
FIG. 2 is a flowchart of a process for creating a synonyms map from common-form entries.

FIG. 2 illustrates one implementation of a process 200 for creating a synonyms map (step 150 of FIG. 1). The process 200 includes receiving common-form entries, as described above (step 210). Any common-form entry containing only one variant that is the same as its common form is omitted from the synonyms map (step 220). Such an entry does not provide synonyms for the common form.

The process 200 also removes any languages associated with a variant that have a frequency that does not exceed a pre-defined absolute threshold (step 230). The absolute threshold is pre-determined and specified on a per-language basis. This threshold is used to remove variants that are likely to be misspellings or mistakes in the training corpus. For a language that is well represented in the training corpus, a large threshold (e.g., 40 for English) will generally omit obscure misspellings. The threshold for a small language which is not well represented would be set lower (e.g., 10) to preserve legitimate but rare words. The threshold can be turned off (or set to 0) for languages which are poorly-represented in the corpus.

Within a particular language, process 200 omits variants for a key if the variant contains a collapsible digraph and its accented equivalent is not also a variant for the key (step 240).

Some variants can have different meaning depending solely on their accents. To avoid undesirable contamination of the synonyms map by such variants, language-specific blacklists of words can be defined. Each blacklist contains a list of words that should not be a variant associated with a given language. If the variant is on a language's blacklist, that language is de-associated from the variant. For example, if "the" is on the French blacklist, then no variant whose common form is "the" can be associated with the French language. This prevents confusion between the English "the" and the French "thé".

For each key, the relative frequency of each variant among all the variants for a particular language is calculated (step 250). To calculate the relative frequency of any given variant in a given language, the number of times the variant occurs in the language is divided by the total number of occurrences of all variants in the same language for the same key. For example, if the key is "elephant", and if "éléphant" occurs in English and French, 100 and 1000 times, respectively; and "eléphant" occurs in English and French 90 and 300 times, respectively, then the relative frequency of "éléphant" in English is 52% (i.e., 100/(100+90)). In one implementation, the relative frequency of each variant for each language is stored in the synonyms map.

From each variant in the synonyms map, the process 200 removes any languages where the language's relative frequency does not meet a pre-defined relative threshold (e.g., 10%) (step 260). The same threshold applies to all variants and all languages. Any variants that are not associated with at least one language are also removed from the synonym map (step 270).

For illustrative purposes the process 200 has been described as a process that alters an existing synonyms map, for example, by removing entries or variants from it. Alternatively, the same effect can be achieved during the initial construction of the synonyms map by not including certain entries or variants in the first place.

An illustrative example synonyms map is shown in FIG. 4. The illustration assumes that the corpus is represented by four languages: English, French, Roman Indic and Bengali. This map contains three keys, "elephant", "liberte" and "nityananda". Each key is associated with numerous variants. In particular the variant "nity.a-nanda" (410) appears in documents from the corpus that are identified as Roman Indic and Bengali. However the variant only occurs in each language 6 times. If an absolute threshold greater than 6 is specified for each language, then these languages and the variant would be removed from the synonyms map.

The variant "nityanānda" appears in three languages (430), according to the language's relative frequency, this variant is relatively minor compared to other variants in each language. If a relative frequency threshold of 10% is applied, these languages and the entire variant would be removed from the synonyms map. Assuming the same relative threshold for the "nityAnanda" variant, the association with the Bengali language (420) would also be removed. This variant and the rest of its language associations would remain since these other languages each occur frequently enough to exceed the assumed relative and absolute thresholds.

One of the useful things that can be done with a synonyms map is to use it to augment queries made to a search engine.

Figure 3:
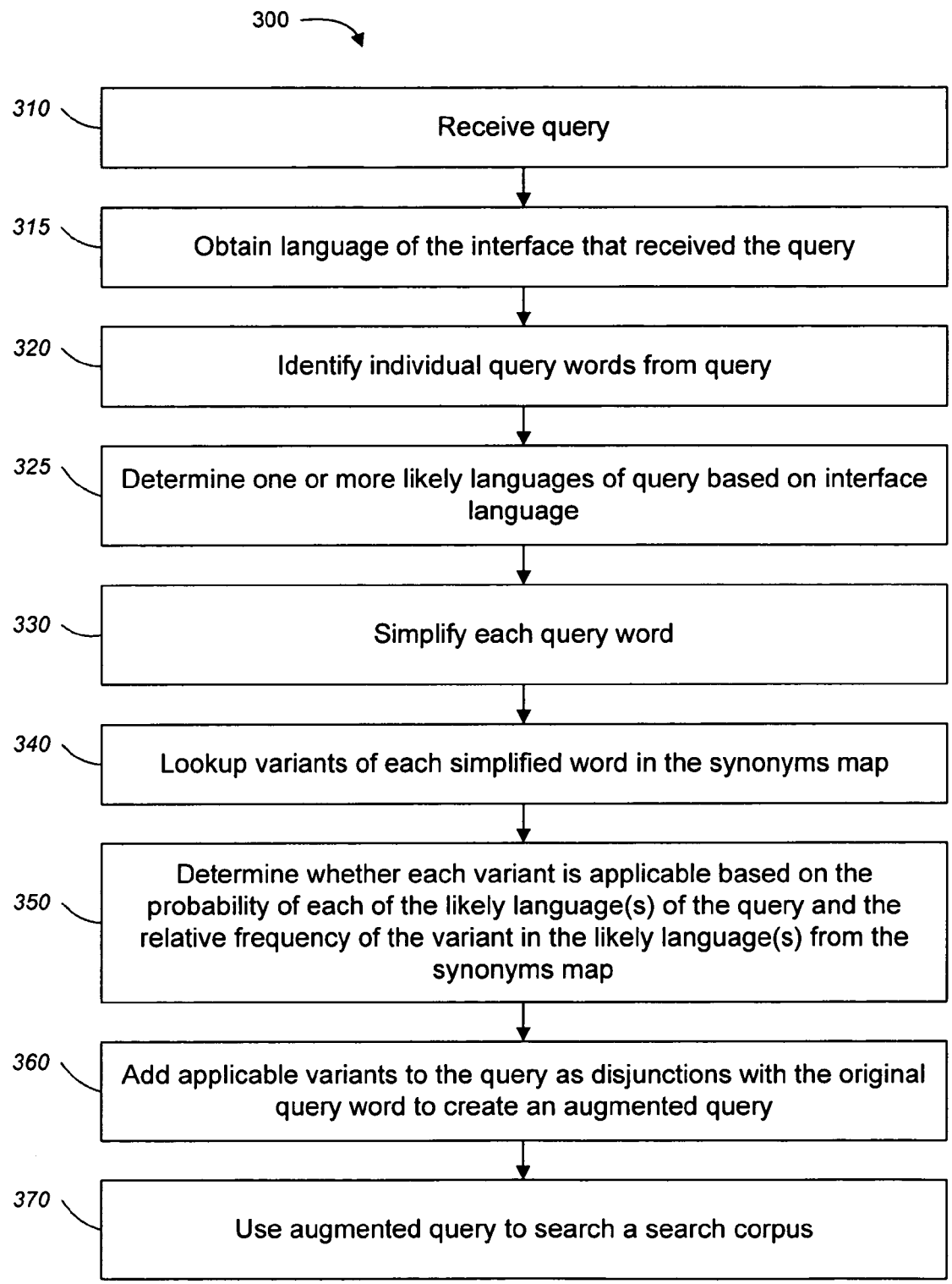
FIG. 3 is a flowchart of a process that rewrites a query.

As shown in FIG. 3, a process 300 can be used to augment a query to incorporate synonyms from the synonyms map. In practice, the query that is received (step 310) often imperfectly describes the user's desired query. The user is constrained by the limitations of an input device and the inconvenience of accurately indicating the language of the query. The ideal synonyms are those that reflect what the user would have provided under ideal circumstances. Process 300 is intended to approximate the ideal synonyms by scoring variants in the synonyms map relative to the words in the query and the language intended by the user, which is approximated by the language of the query.

Process 300 determines the language of the interface that received the query (step 315). A user provides the query to an interface. The interface will have an interface language, that is, a language in which the interface presents information to the user, e.g., English, French, or Esperanto. However, the words within a query are not necessarily in the same language as the interface the query was provided to.

The process 300 identifies individual words from the query (step 320). The identification of words depends on the particular conventions of the query language. In Latin script languages, for example, words are delimited by spaces or other punctuation (e.g., '-').

The process 300 determines which languages the query is likely to be in (step 325). In one implementation, the query language is determined in two parts: determining a likelihood that the query is in the language of the interface, e.g., a probability; and determining for each term in the query, a likelihood, e.g., a probability, that the term is in some particular language.

Determining whether the query is likely to be in the same language as the interface language can be done using past queries. If a past query delivered search results, the past query can be automatically classified as being in a particular language based on the language of the results that the user subsequently selected. It is reasonable to assume that the language of the query is the same as the language of the documents the user chose to view, especially if the presentation of choices includes snippets from the search results documents. A past query can also be manually inspected to determine its language. Both automatic and manual techniques can be combined: the queries that have been manually classified serve as seeds used during automatic determination to improve accuracy. Results of the automatic classifier can inform subsequent adjustment of the classifier. Manual seeding and adjustment of the query classifier can be iteratively repeated to further improve the accuracy. The current query, in its entirety, is matched with past queries received by the same interface, generating a likelihood score or a probability that the query is in the same language as the interface language.

The process 300 determines how often a term from the query occurs in the corpus within documents for each language. From the frequency counts, a vector is generated that, for each language, gives a likelihood score in the range of zero to one that the term is in the language. A score vector, e.g., a probability vector, is generated for each term in the query.

Words that appear in many different languages, for example, proper names (e.g., Internet), can unduly affect the score vector for the query. The scores of such words, if found among the query terms, can be arbitrarily set to suggest that the word is likely in the interface language. Alternatively, such words can be ignored.

The process 300 can further process each vector by smoothing it. In one implementation, while computing the vector, a small smoothing value s is added to reduce noise. For example, if term t occurs n times in language L and N times across k languages, then the probability that the term is in the language is smoothed to be $P(L|t)=(n+s)/(k \times s+N)$, rather than $P(L|t)=n/N$. The smoothing value can be selected depending on size of N and k. For example, s can be selected to increase as N increases and to decrease as k increases.

Query language identification is further described in U.S. patent application Ser. No. 60/793,677, entitled Query Language Identification, to inventor Fabio Lopiano, filed on Apr. 19, 2006, the entire disclosure of which is incorporated here by reference.

All of the vectors from the previous step are multiplied together. The resultant vector is multiplied by the probability (or score) that the query is in the language of the interface, producing a query probability (or score) vector. This query probability vector contains, for each language, a probability (or score) that the query is in the language. The language with the highest probability (or score) is selected as the query language that is attributed to the query.

The process 300 simplifies each word in the query (step 330). In simplifying each word, the process collapses digraphs, removes accents, and transliterates characters in each word. This is accomplished in exactly the same way as common forms were derived from the training corpus, as described above. However, the specific conversion maps used to simplify query words here are in some respects different from the conversion maps used in the creation of the synonyms map. In particular, simplifying each word is normally language independent.

In specific cases, however, the identified query language can affect how query words are simplified. This is particularly important when the result of word simplification makes no sense in the query language. For example, in Turkish 'ue' is a nonsensical substitution for 'ü', unlike in German. Simplifying "Türk" to "Tuerk" would be undesirable for a Turkish user.

In general, the simplified words from the query are used to look up and retrieve variants from the synonyms map using each simplified words as a key (step 340). Each variant is a potential synonym of the original query word. The relative frequency under a key of each variant within each language is used to estimate whether the variant is desirable as a synonym for the key in each language (step 350). This estimate is calculated by summing, for each language, the probability that the query is in the language multiplied by the relative frequency of the variant in that language. For example, consider when "éléphant" is a variant in English 52% of the time and a variant in French 77% of the time. Then for a query determined likely to be in English with a probability of 70% and French with a probability of 30%, the resultant estimate for "éléphant" is: 52%×70%+77%×30%=59.5%. If the calculated estimation exceeds a synonyms probability threshold (e.g., 50%), the variant is selected to augment the query. The particular synonyms probability threshold is selected to provide good results given the language statistics in the synonyms map and the probabilities provided by the query language classifier. In the special case that a variant, in the given language, is the result of collapsible digraphs, then the relative frequency of the variant is reduced (e.g., quartered) when calculating the variant's estimate. This penalty to the variant's relative frequency reflects the potential risk of having collapsed the variant's digraphs inappropriately.

Each selected variant is added to the query (step 360), unless the variant is a stop word and the variant does not appear in the probable query language: such variants are ignored. Each original term from the query is augmented with each of its selected variants. Each variant is appended as a conjunction with the original term. For example, the query "eléphant trunk" is augmented to "(eléphant or elephant or éléphant) trunk", assuming that both elephant and éléphant are selected variants for elephant.

The process uses the augmented query to search a search corpus (step 370). The search corpus contains documents in their original, unaltered form. Except for the effects of augmenting of the query, searching and providing results from the corpus is not otherwise affected.

If the probable query language is an under-represented language in the search corpus (i.e., a small proportion of the total documents), then it can be undesirable to include variants from the synonyms map. Adding variants to the search query increases the risk of matching documents from outside the desired language, potentially overwhelming the results with foreign language documents. However, when the original query word contains only unaccented letters and does not contain collapsible digraphs (e.g., "ueber", simplified to "uber"), then variants should be sought regardless of the probable query language. In one implementation the decision to include variants depends on the interface language rather than the query language.

FIG. 5A through FIG. 34 illustrate one implementation of the conversion maps used to map words in the training corpus or to simplify words in a search query. Each figure shows one or more named groups of conversion maps. Each conversion map is shown as one line in one column in the figures. A conversion map is shown with at least an input character and an output character, as discussed above. In addition, columns marked "UCS" show the hexadecimal value of a character's encoding according to the Universal Character Set (UCS). When a UCS value is not given, each character is one of the 95 printable ASCII characters.

The grouping of conversion maps is governed by convenience or convention rather than necessity: one or more conversion map groups can constitute the language-specific mapping for a particular language. The composition of groups for a particular language can depend on whether the groups are used to map words in the training corpus or to simplify words in a query.

FIGS. 5A, 5B, and 5C illustrate a generic group of conversion maps. Generally, these are safe conversion maps that are unlikely to conflict with the conversion maps pertaining to particular languages.

FIG. 6 illustrates a Russian group of conversion maps. This group is used to map words from Russian documents during generation of the synonyms map.

FIG. 7 illustrates a Macedonian group of conversion maps. This group is used to map words from Macedonian documents during generation of the synonyms map.

FIG. 8 illustrates a Ukrainian group of conversion maps. This group is used to map words from Ukrainian documents during generation of the synonyms map.

FIG. 9 illustrates a Greek group of conversion maps. This group is used to map words from Greek documents during generation of the synonyms map As shown in FIG. 10 and FIG. 11, some conversion maps also specify the accented equivalent of the collapsed digraph (column headed "A.E." in the figures). These maps have a two-character input, i.e., the collapsible digraph, and one output, the collapsed digraph. This information can be used to determine whether two characters (input) are collapsible digraphs. Alternatively, this information also indicates whether a particular character (output) can be the result of a collapsible diagraph.

FIG. 10 illustrates an Esperanto H/X-System group of conversion maps. This group is used to map words from Esperanto documents during generation of the synonyms map.

FIG. 11 illustrates a Ch and an ShZh groups of conversion maps. This group is composed with other groups during generation of the synonyms map and query term simplification.

FIG. 12 illustrates a Croatian group of conversion maps. This group is used to map words from Croatian documents during generation of the synonyms map. The Generic, Ch, ShZh, A-Umlaut, O-Umlaut, U-Umlaut, and Y-Umlaut groups are composed and used to simplify query terms that are identified as Croatian. The A-Umlaut, O-Umlaut, U-Umlaut, and Y-Umlaut groups are described below in reference to FIG. 23.)

FIG. 13 illustrates a Catalan group of conversion maps. This group is used to map words from Catalan documents during generation of the synonyms map.

FIG. 14 illustrates a Serbian group of conversion maps. This group is composed with the Croatian group and used to map words from Serbian documents during generation of the synonyms map. The Generic, A-Umlaut, O-Umlaut, U-Umlaut, Y-Umlaut, Ch, ShZh and Serbian groups are composed and used to simplify query terms that are identified as Serbian.

FIG. 15 illustrates a French group of conversion maps. This group is used to map words from French documents during generation of the synonyms map.

FIG. 16 illustrates an Italian group of conversion maps. This group is used to map words from Italian documents during generation of the synonyms map.

FIG. 17 illustrates a Portuguese group of conversion maps. This group is used to map words from Portuguese documents during generation of the synonyms map.

FIG. 18 illustrates a Romanian group of conversion maps. This group is used to map words from Romanian documents during generation of the synonyms map.

FIG. 19 illustrates a Spanish group of conversion maps. This group is used to map words from Spanish documents during generation of the synonyms map.

FIG. 20 illustrates a Dutch group of conversion maps. This group is used to map words from Dutch documents during generation of the synonyms map. The Generic, A-Umlaut, O-Umlaut, U-Umlaut, and Dutch-Y groups are composed and used to simplify query terms that are identified as Dutch.

FIG. 21 illustrates a Danish group of conversion maps. This group is used to map words from Danish documents during generation of the synonyms map.

FIG. 22 illustrates an English group of conversion maps. This group is used to map words from English documents during generation of the synonyms map.

FIG. 22 also illustrates a German group of conversion maps. This group is used to map words from German documents during generation of the synonyms map. The Generic, Y-Umlaut and German Umlaut groups are used to simplify query terms that are identified as German.

FIG. 22 also illustrates a Dutch-Y group of conversion maps. This group is composed with other groups to simplify query terms that are identified as Dutch.

FIG. 22 also illustrates a German Umlaut group of conversion maps. This group is composed with other groups to simplify query terms that are identified as German.

FIG. 22 also illustrates a Swedish group of conversion maps. This group is used to map words from Swedish documents during generation of the synonyms map. The Generic, U-Umlaut and Y-Umlaut groups are used to simplify query terms that are identified as Swedish or Finnish.

FIG. 23 shows four groups: A-Umlaut, O-Umlaut, U-Umlaut and Y-Umlaut groups. These groups are used in composition with other groups to simplify query terms.

FIG. 24 illustrates an Icelandic group of conversion maps. This group is used to map words from Icelandic documents during generation of the synonyms map.

FIG. 25 illustrates a Czech group of conversion maps. This group is composed with the ShZh group and used to map words from Czech documents during generation of the synonyms map. The Generic, A-Umlaut, O-Umlaut, U-Umlaut, Y-Umlaut and ShZh groups are used to simplify query terms that are identified as Czech.

FIG. 26 illustrates a Latvian group of conversion maps. This group is composed with the Ch and ShZh group and used to map words from Latvian documents during generation of the synonyms map. The Generic, A-Umlaut, O-Umlaut, U-Umlaut, Y-Umlaut, Ch and ShZh groups are used to simplify query terms that are identified as Latvian.

FIG. 27 illustrates a Lithuanian group of conversion maps. This group is composed with the Ch and ShZh group and used to map words from Lithuanian documents during generation of the synonyms map. The Generic, A-Umlaut, O-Umlaut, U-Umlaut, Y-Umlaut, Ch and ShZh groups are used to simplify query terms that are identified as Lithuanian.

FIG. 28 illustrates a Polish group of conversion maps. This group is used to map words from Polish documents during generation of the synonyms map.

FIG. 29 illustrates a Slovakian group of conversion maps. This group is composed with the ShZh group and used to map words from Slovakian documents during generation of the synonyms map. The Generic, A-Umlaut, O-Umlaut, U-Umlaut, Y-Umlaut and ShZh groups are composed and used to simplify query terms that are identified as Slovakian FIG. 30 illustrates a Slovenian group of conversion maps. This group is composed with the Ch and ShZh group and used to map words from Slovenian documents during generation of the synonyms map.

FIG. 31 illustrates an Estonian group of conversion maps. This group is composed with the Ch and ShZh group and used to map words from Estonian documents during generation of the synonyms map. The Generic, A-Umlaut, O-Umlaut, U-Umlaut, Y-Umlaut, Ch and ShZh groups are composed and used to simplify query terms that are identified as Estonian.

FIG. 32 illustrates a Hungarian group of conversion maps. This group is used to map words from Hungarian documents during generation of the synonyms map.

FIG. 33 illustrates an Esperanto group of conversion maps. This group is composed with the Esperanto HX-system group and used to map words from Esperanto documents during generation of the synonyms map. The Generic, A-Umlaut, O-Umlaut, U-Umlaut, Y-Umlaut and Esperanto HX-system groups are composed and used to simplify query terms that are identified as Esperanto.

FIG. 34 illustrates a Turkish group of conversion maps. This group is used to map words from Turkish documents during generation of the synonyms map.

The table below illustrates which conversion map groups can be used to map words during generation of the synonyms map. Each language is specified with its blacklist of characters (as discussed above), and one or more conversion map groups which together constitute the suite of conversion maps used while deriving a common form from words in the training corpus.

| Language | Character Blacklist | Conversion Maps |
| --- | --- | --- |
| Catalan | kw | Catalan |
| French | | French |
| Italian | jkwxy | Italian |
| Portuguese | kw | Portuguese |
| Romanian | kqwy | Romanian |
| Spanish | w | Spanish |
| Danish | | Danish |
| Dutch | | Dutch |
| English | | English |
| German | | German |
| Icelandic | cqw | Icelandic |
| Swedish | | Swedish |
| Estonian | qwxy | Ch, ShZh, Estonian |
| Finnish | bcfqwxz | |
| Hungarian | qwxy | Hungarian |
| Greek | | Greek |
| Turkish | qwx | Turkish |
| Croatian | qwxy | Croatian |
| Czech | qwx | ShZh, Czech |
| Latvian | qwxy | Ch, ShZh, Latvian |
| Lithuanian | qwxy | Ch, ShZh, Lithuanian |
| Macedonian | | Macedonian |
| Norwegian | | Danish |
| Polish | qvx | Polish |
| Russian | | Russian |
| Serbian | qwxy | Croatian, Serbian |
| Slovak | qw | ShZh, Slovakian |
| Slovenian | qwxy | Ch, ShZh, Slovenian |
| Ukrainian | | Ukrainian |
| Esperanto | qwxy | Esperanto (hx-system), Esperanto |

Figure 35:
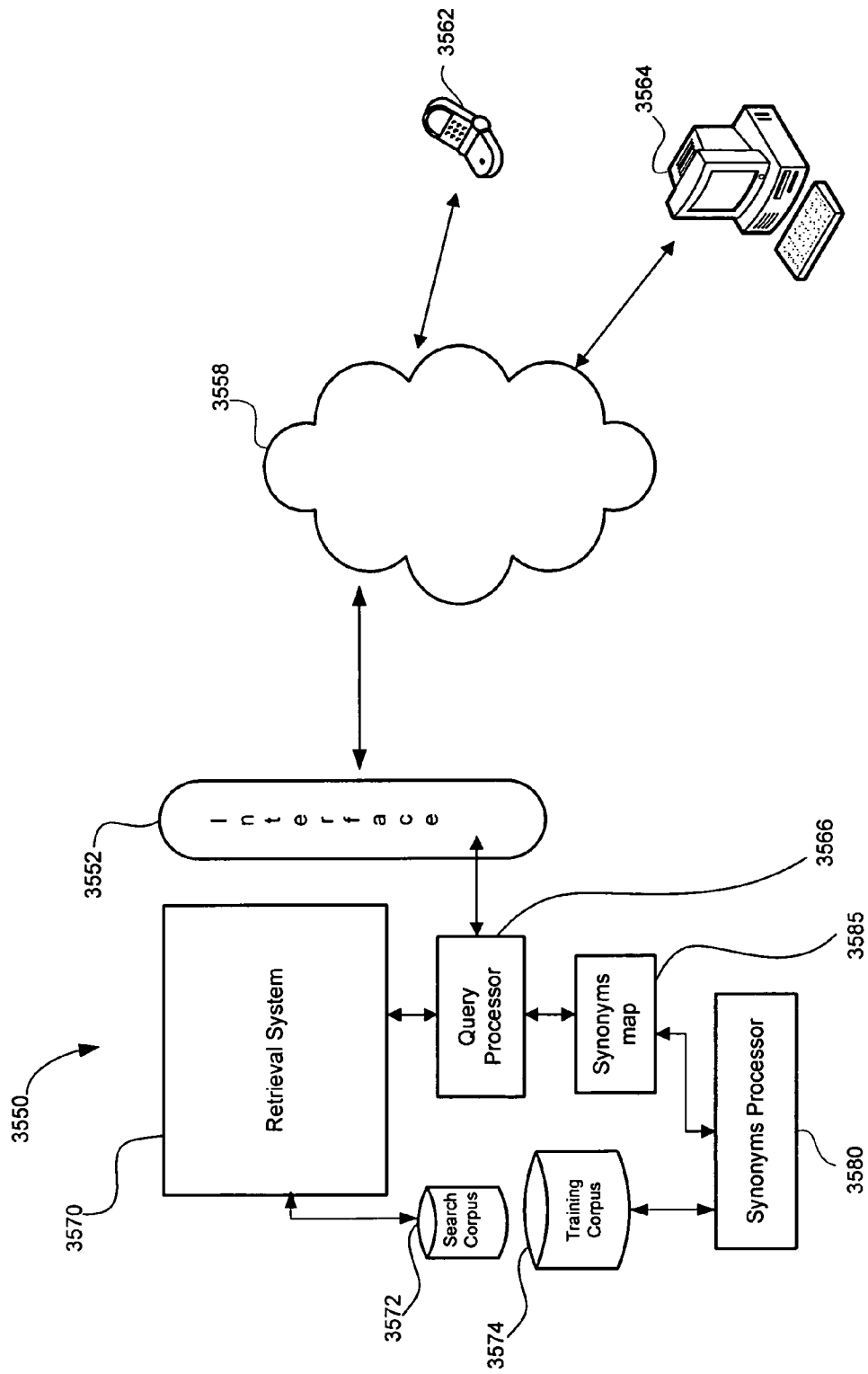
FIG. 35 is a block diagram of a search engine.

FIG. 35 is a schematic diagram of a search engine 3550 that receives multilingual queries and provides multilingual results in response. The system 3550 is generally equipped to obtain information about the occurrences and frequency of terms from various sources, and to generate search results in response to queries based upon an analysis of word use in such sources. Such sources could include, for example, multilingual documents and files found on the Internet.

The system 3550 includes one or more interfaces 3552 each in a different language. The interfaces allow users to use and interact with the services of the search engine. In particular, the interface receives queries from users. A query includes a list of words where each word can be in any language. None of the words in the query need be in the language of the interface. The specific interface 3552 which receives a user's query is dependent on the user's choice of interface.

System 3550 can be communicatively connected to a network such as the Internet 3558, and thereby can communicate with various devices connected to the Internet such as wireless communication devices 3562, and personal computers 3564. The communication flow for any device can be bidirectional so that system 3550 receives information (e.g., queries or the contents of documents) from the devices and can also send information (e.g., results) to the devices.

Queries received by the interface 3552 are provided to a query processor 3566. The query processor 3566 processes the query, optionally augments it, and passes it on to another component of system 3550. For example, query processor 3566 can cause the retrieval system 3570 to generate search results corresponding to the query. Such a retrieval system 3570 can use data retrieval and search techniques like those used by the Google PageRank™ system. The results generated by retrieval system 3570 can then be provided back to the original querying device.

The system 3550 can rely on a number of other components for its proper operation. For example, the system 3550 refers to a search corpus 3572 of documents each time a request is made. The search corpus can be indexed to make searching more efficient. The search corpus can be populated using information collected from documents found on the Web (e.g., by a web crawler). The documents can also be stored in a training corpus 3574 for subsequent processing.

The training corpus 3574 can be processed by a synonyms processor 3580. The synonyms processor 3580 can generate a synonyms map 3585 from the training corpus 3574. The synonyms map 3585 can be used by the query processor 3566 to augment search queries with synonyms.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer implemented method, comprising:
  receiving from a user through a user interface a search query comprising one or more original query terms for searching a collection of documents, the user interface having a user interface language;
  identifying the user interface language as a small language or not a small language, a small language being a natural language having a relatively small representation in the collection of documents;
  simplifying each query term to a simplified form; and
  if the user interface language is a small language, for each original query term that has a simplified form that is different from the original term, using the original query term as-is and not providing any synonyms for the query term, and for each original query term that is identical to its simplified form, using the simplified form to identify synonyms for the original query term for use in augmenting the search query.

2. The method of claim 1, wherein simplifying each query term comprises transliterating.

3. The method of claim 1 in which the collection of documents were identified by a web crawler.

4. The method of claim 1 in which the collection of documents includes documents in different languages.

5. The method of claim 1 in which simplifying each query term further comprises one or more of: collapsing a digraph in the query term, and removing an accent from the query term.

6. The method of claim 1 in which using the simplified form to identify synonyms for the original query term comprises identifying a synonym for the simplified form based on respective relative frequencies of the synonym in respective languages. transliterating.

7. A computer program product, encoded on a computer-readable storage device, operable to cause data processing apparatus to perform operations comprising:
   receiving from a user through a user interface a search query comprising one or more original query terms for searching a collection of documents, the user interface having a user interface language;
   identifying the user interface language as a small language or not a small language, a small language being a natural language having a relatively small representation in the collection of documents;
   simplifying each query term to a simplified form; and
   if the user interface language is a small language, for each original query term that has a simplified form that is different from the original term, using the original query term as-is and not providing any synonyms for the query term, and for each original query term that is identical to its simplified form, using the simplified form to identify synonyms for the original query term for use in augmenting the search query.

8. The product of claim 7, wherein simplifying each query term comprises transliterating.

9. The product of claim 7 in which the collection of documents were identified by a web crawler.

10. The product of claim 7 in which the collection of documents includes documents in different languages.

11. The product of claim 7 in which simplifying each query term further comprises one or more of: collapsing a digraph in the query term, and removing an accent from the query term.

12. The product of claim 7 in which using the simplified form to identify synonyms for the original query term comprises identifying a synonym for the simplified form based on respective relative frequencies of the synonym in respective languages. transliterating.

13. A system comprising:
   one or more computers configured to perform operations comprising:
   receiving from a user through a user interface a search query comprising one or more original query terms for searching a collection of documents, the user interface having a user interface language;
   identifying the user interface language as a small language or not a small language, a small language being a natural language having a relatively small representation in the collection of documents;
   simplifying each query term to a simplified form; and
   performing operations if the user interface language is a small language, for each original query term that has a simplified form that is different from the original term, using the original query term as-is and not providing any synonyms for the query term, and for each original query term that is identical to its simplified form, using the simplified form to identify synonyms for the original query term for use in augmenting the search query.

14. The system of claim 13, wherein simplifying each query term comprises transliterating.

15. The system of claim 13 in which the collection of documents were identified by a web crawler.

16. The system of claim 13 in which the collection of documents includes documents in different languages.

17. The system of claim 13 in which simplifying each query term further comprises one or more of: collapsing a digraph in the query term, and removing an accent from the query term.

18. The system of claim 13 in which using the simplified form to identify synonyms for the original query term comprises identifying a synonym for the simplified form based on respective relative frequencies of the synonym in respective languages.

* * * * *

UNITED STATES PATENT AND TRADEMARK OFFICE
CERTIFICATE OF CORRECTION

PATENT NO.         : 7,835,903 B2
APPLICATION NO.    : 11/407860
DATED              : November 16, 2010
INVENTOR(S)        : Ruchira S. Datta Page 1 of 1

It is certified that error appears in the above-identified patent and that said Letters Patent is hereby corrected as shown below:

Column 17, Line 17 at Claim 6, after "languages" delete "transliterating"
Column 18, Line 8 at Claim 12, after "languages" delete "transliterating"

Signed and Sealed this
First Day of March, 2011

David J. Kappos
*Director of the United States Patent and Trademark Office*